(12) United States Patent
Hsieh

(10) Patent No.: US 7,665,879 B2
(45) Date of Patent: Feb. 23, 2010

(54) LIGHT EMITTING UNIT AND BACK PLATE THEREOF

(75) Inventor: Hsin-Po Hsieh, Changhua County (TW)

(73) Assignee: Gio Optoelectronics Corp., Yungkang, Tainan County (TW)

( * ) Notice: Subject to any disclaimer, the term of this patent is extended or adjusted under 35 U.S.C. 154(b) by 228 days.

(21) Appl. No.: 11/902,457

(22) Filed: Sep. 21, 2007

(65) Prior Publication Data

US 2008/0074877 A1    Mar. 27, 2008

(30) Foreign Application Priority Data

Sep. 25, 2006  (TW) .............. 95135444 A
Aug. 17, 2007  (TW) .............. 96130510 A

(51) Int. Cl.
*F21V 7/04*  (2006.01)

(52) U.S. Cl. .................. 362/633; 362/33; 362/97.1; 349/58

(58) Field of Classification Search .......... 362/33, 362/97, 236, 240, 244–246, 355, 561, 611, 362/614, 627, 632, 633, 634; 349/56–58, 349/61, 62, 64, 70; 40/541, 542, 564–573
See application file for complete search history.

(56) References Cited

U.S. PATENT DOCUMENTS

| 3,936,968 A | * | 2/1976 | Gilbert | 40/783 |
| 4,662,092 A | * | 5/1987 | Kim | 40/784 |
| 4,833,803 A | * | 5/1989 | Schwartz | 40/783 |
| 5,943,801 A | * | 8/1999 | Wilkinson | 40/564 |
| 7,178,967 B2 | * | 2/2007 | Kim | 362/633 |
| 2003/0192220 A1 | * | 10/2003 | Chang et al. | 40/783 |

* cited by examiner

*Primary Examiner*—Hargobind S Sawhney
(74) *Attorney, Agent, or Firm*—Birch, Stewart, Kolasch & Birch, LLP

(57) ABSTRACT

A back plate of a light emitting unit includes a bottom plate, a plurality of first extruding elements, a plurality of second extruding elements and a plurality of connecting elements. The first extruding elements are respectively disposed on two opposite edges of the bottom plate, and the second extruding elements are respectively disposed on the other two opposite edges of the bottom plate. Each of the connecting elements connects the corresponding first and second extruding elements. The first extruding elements, the second extruding elements and the connecting elements form a closed region.

11 Claims, 5 Drawing Sheets

LIGHT EMITTING UNIT AND BACK PLATE THEREOF

CROSS REFERENCE TO RELATED APPLICATIONS

This Non-provisional application claims priority under 35 U.S.C. §119(a) on Patent Application No(s). 095135444 filed in Taiwan, Republic of China on Sep. 25, 2006, and 096130510 filed in Taiwan, Republic of China on Aug. 17, 2007, the entire contents of which are hereby incorporated by reference.

BACKGROUND OF THE INVENTION

1. Field of Invention

The invention relates to a light emitting unit and a back plate thereof that have strengthened structural intensity.

2. Related Art

By the digital era, the technology of liquid crystal displays (LCD) has been developed rapidly and the LCDs have become one of the indispensable electronic products. Accordingly, the requirements for the technique and functions of the LCD become more critical.

In general, the LCD mainly includes a LCD panel and a backlight module. The LCD panel includes two substrates and a liquid crystal layer sandwiched between the substrates. The backlight module emits light, which uniformly illustrates the surface of the LCD panel, so the backlight module can be a light emitting unit. Of course, the light emitting unit is widely used in many application fields, other than the backlight module, such as the light source of varies electronic apparatuses and the illustration of daily life.

As shown in FIG. 1, a conventional light emitting unit 1, which is for example a direct type backlight module, includes a back plate 11, a plurality of fluorescent lamps 12, a diffuser 13, a frame housing 14, a plurality of lamp fixing base 15 and a plurality of spacers 16. The spacers 16 are disposed at two ends of each fluorescent lamp 12. The fluorescent lamp 12 passes through a through hole 151 of the lamp fixing base 15 and is fixed therein, so that the fluorescent lamps 12 can be disposed on the back plate 11. Herein, the fluorescent lamps 12 are, for example, linear fluorescent lamps. The back plate 11 has a plurality of first fixing portions 111 and a plurality of second fixing portions 112. The first fixing portions 111 are disposed at two opposite edges of the back plate 11, and the second fixing portions 112 are disposed at the other two opposite edges of the back plate 11. The diffuser 13 is disposed over the fluorescent lamps 12 for uniforming the light emitted from the fluorescent lamps 12. For example, the diffuser 13 can be disposed on the lamp fixing base 15. Of course, the light emitting unit 1 may further include other optical films such as a prism film, a top diffusion film, and a bottom diffusion film (not shown). The frame housing 14 is disposed on the diffuser 13 and is connected with the first fixing portions 111 and the second fixing portions 112 by screwing or wedging. By this way, the diffuser 13 can be fixed between the frame housing 14 and the lamp fixing base 15.

The back plate 11 is usually made of metal. Different sizes of molds must be firstly prepared for manufacturing the light emitting unit of different sizes. Then, the mold is utilized in cooperating with the pressing process to form a pressed sheet metal, which is used as the back plate 11. The back plate 11 is the foundation determining the structural intensity of the light emitting unit 1. In more details, all of the components of the light emitting unit 1 are disposed on, screwed on or adhered to the back plate 11. Therefore, the back plate 11 is usually made of thicker sheet metal, or many additional elements are disposed to strengthen the structural intensity. As mentioned above, various molds must be prepared for manufacturing the light emitting units of different sizes and the weight of light emitting unit 1 is increased due to the thicker back plate 11.

Therefore, it is an important subject to provide a light emitting unit and a back plate thereof that have strengthened structural intensity and do not need to prepare molds of different sizes.

SUMMARY OF THE INVENTION

In view of the foregoing, the invention is to provide a light emitting unit and a back plate thereof that have strengthened structural intensity and do not need to prepare molds of different sizes.

To achieve the above, the invention discloses a back plate of a light emitting unit. The back plate includes a bottom plate, a plurality of first extruding elements, a plurality of second extruding elements and a plurality of connecting elements. The first extruding elements are respectively disposed on two opposite edges of the bottom plate. The second extruding elements are respectively disposed on the other two opposite edges of the bottom plate. The connecting elements are connected with the first extruding elements and the second extruding elements, respectively. The first extruding elements, the second extruding elements and the connecting elements form a closed region.

To achieve the above, the invention also discloses a light emitting unit including a back plate and at least one lamp disposed on the back plate. The back plate includes a bottom plate, a plurality of first extruding elements, a plurality of second extruding elements and a plurality of connecting elements. The first extruding elements are respectively disposed on two opposite edges of the bottom plate. The second extruding elements are respectively disposed on the other two opposite edges of the bottom plate. The connecting elements are connected with the first extruding elements and the second extruding elements, respectively. The first extruding elements, the second extruding elements and the connecting elements form a closed region.

As mentioned above, in the light emitting unit and back plate of the invention, at least one lamp is disposed on the back plate and a plurality of connecting elements are provided to connect the first and second extruding elements so as to form a closed region. In addition, the first extruding elements, the second extruding elements and the connecting elements are all disposed over the lamp and the bottom plate. The first extruding elements are disposed on two opposite edges of the bottom plate, and the second extruding elements are disposed on the other two opposite edges of the bottom plate. Compared with the related art, the first extruding elements and the second extruding elements are formed by cutting a striped-shaped extruding work piece, which is formed by extrusion molding with a die, into different lengths according to the size of the light emitting unit. By this manufacturing method, the first and second extruding elements can be applied to the light emitting units of different sizes. Therefore, the various molds used in the related art are unnecessary, so that the manufacturing cost can be reduced. Furthermore, the anti-bending abilities of the first and second extruding elements are both good. Thus, when the first and second extruding elements are combined with the connecting elements, the closed region with the strengthened structural and anti-torque intensities can be formed so as to avoid the deformation of the light emitting unit caused by external forces. Moreover, since the structural intensity of the back plate is mainly provided by the first and second extrusion elements, the lamp fixing base of the related art is unnecessary. In addition, the conventional back plate for fixing the major components is also unnecessary so that the bottom plate can be made of thinner metal or non-metal sheet. This can reduce the manufacturing cost and the weight of the light emitting unit.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
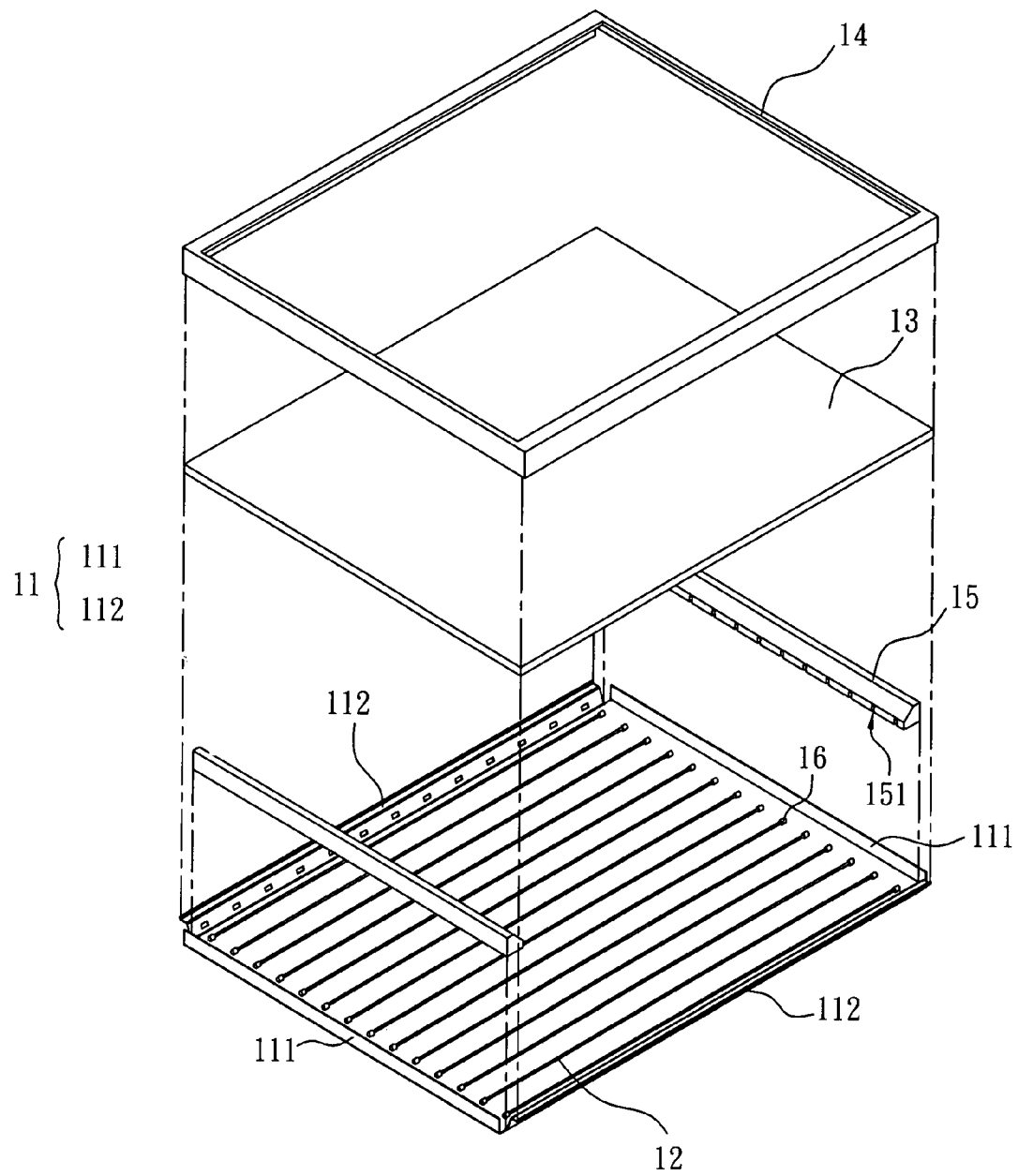
FIG. 1 is a schematic illustration showing the conventional light emitting unit.
Figure 2:
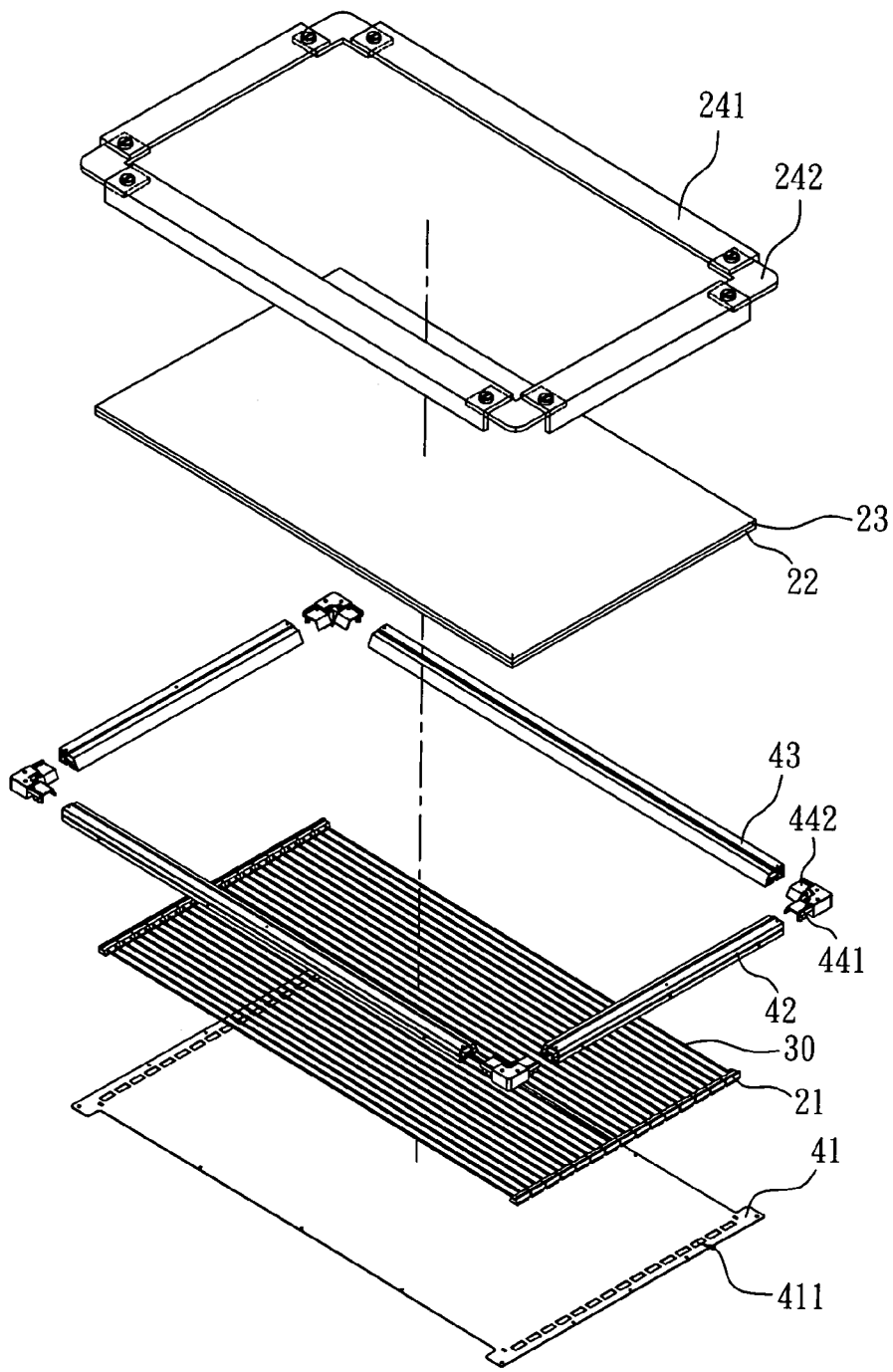
FIG. 2 is a schematic illustration showing a light emitting unit according to a preferred embodiment of the invention.

With reference to FIG. 2, a light emitting unit 20 according to a preferred embodiment of the invention includes at least one lamp 30 and a back plate 40. The light emitting unit 20 can be an illustration apparatus or a backlight module of a LCD, and, in the embodiment, the light emitting unit 20 is a backlight module.

In the embodiment, the lamp 30 is a linear lamp such as a cold cathode fluorescent lamp (CCFL). In addition, the light emitting unit 20 may further includes a circuit board (not shown) and a plurality of spacers 21, which are disposed at two ends of the lamps 30. The lamps 30 are disposed on the back plate 40 and electrically connected with the circuit board underneath the back plate 40.

Figure 3:
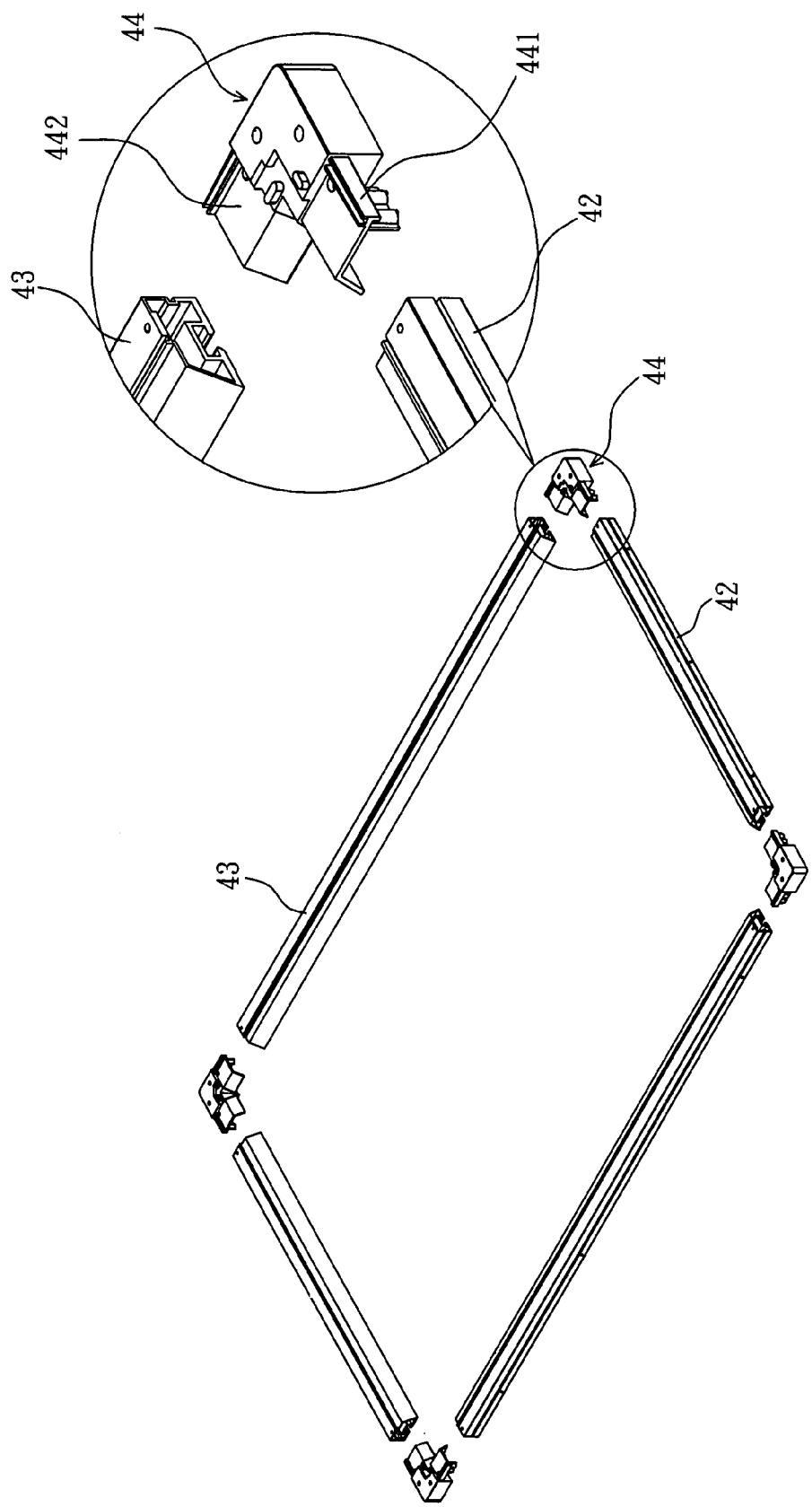
FIG. 3 is a schematic illustration showing first extruding elements, second extruding elements and connecting elements of the light emitting unit according to the preferred embodiment of the invention.

Referring to FIGS. 2 and 3, the back plate 40 includes a bottom plate 41, a plurality of first extruding elements 42, a plurality of second extruding elements 43 and a plurality of connecting elements 44.

The bottom plate 41 has a plurality of through holes 411, which are disposed at the opposite edges of the bottom plate 41. The lamps 30 are disposed on the bottom plate 41, and the spacers 21 pass through the through holes 411, respectively. Accordingly, the lamps 30 and the spacers 21 can be fixed on the bottom plate 41.

Figure 4A:
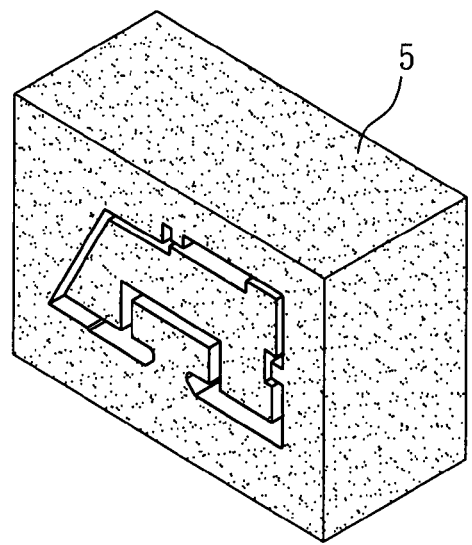
FIGS. 4A and 4B are schematic illustrations showing dies for manufacturing the extruding elements by extrusion molding according to the preferred embodiment of the invention.
Figure 4B:
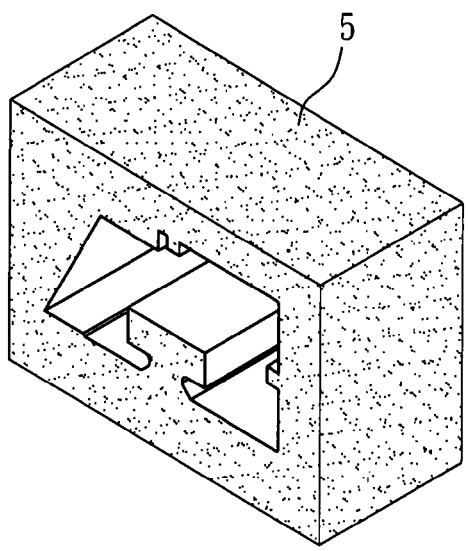

In the embodiment, the first extruding elements 42 are respectively disposed at two opposite edges of the bottom plate 41, and the second extruding elements 43 are respectively disposed at the other two opposite edges of the bottom plate 41. In the following descriptions, the back plate 40 includes two first extruding elements 42 and two second extruding elements 43. The first extruding elements 42 and the second extruding elements 43 can be manufactured by extrusion molding with utilizing the same die 5 such as a hollow die (see FIG. 4A) or a solid die (see FIG. 4B). Thus, the first extruding elements 42 and the second extruding elements 43 are, for example but not limited to, stripe-shaped. The cross sections of the first extruding element 42 and the second extruding element 43 are the same, and the lengths thereof can be determined according to actual needs. Alternatively, if the structures of the first extruding element 42 and the second extruding element 43 are different due to other requirements, the dies for manufacturing them are different.

In addition, the first extruding elements 42 and the second extruding elements 43 are manufactured by extrusion molding with utilizing the die 5, so that the material thereof is usually aluminum or alloy. In more details, to manufacture the first extruding elements 42 and the second extruding elements 43, the material of aluminum or alloy is firstly extruded to pass through the die 5. Accordingly, the material of aluminum or alloy can be extruded to form a stripe-shaped extruding work piece. Then, the stripe-shaped extruding work piece is cut into different lengths according to the size requirements of the light emitting unit 20. In this embodiment, the length of the first extruding element 42 is longer than that of the second extruding element 43.

Figure 5:
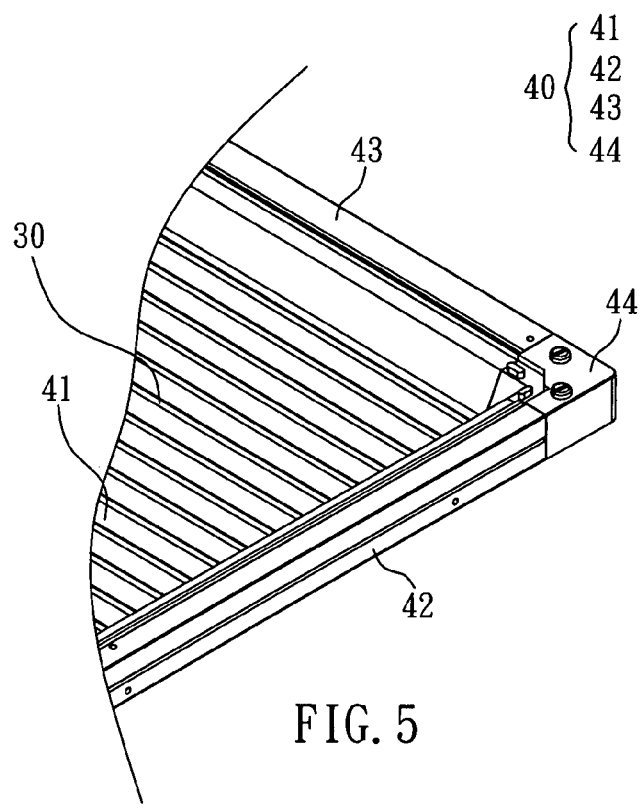
FIG. 5 is a schematic illustration showing a back plate of the light emitting unit according to the preferred embodiment of the invention.
Figure 6:
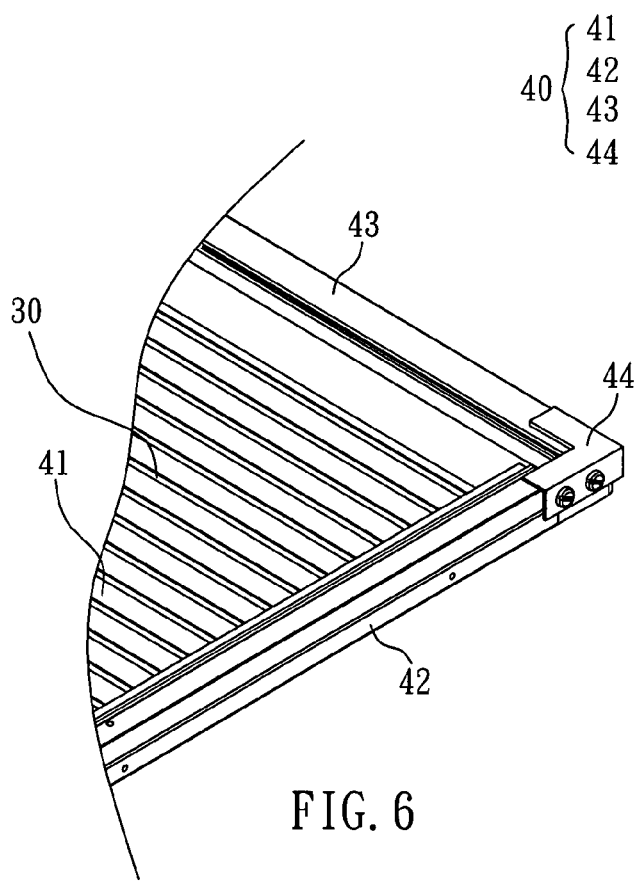
FIG. 6 is a schematic illustration showing the back plate of the light emitting unit according to the preferred embodiment of the invention, wherein the connecting element is an angle bar.

Referring to FIG. 3, each of the connecting elements 44 has a first connecting portion 441 and a second connecting portion 442. The first connecting portion 441 connects to the first extruding element 42, and the second connecting portion 442 connects to the second extruding element 43. In the following description, the back plate 40 includes four connecting elements 44 for example. As shown in FIG. 3, four connecting elements 44, two first extruding elements 42 and two second extruding elements 43 are connected to form a closed region, such as a rectangular region. Each of the connecting elements 44 is connected with the first extruding element 42 and the second extruding element 43 by, for example but not limited to, screwing or inserting. Moreover, the connecting element 44 can be inserted to the first extruding element 42 and the second extruding element 43, and then screwed thereto (as shown in FIG. 5). Alternatively, as shown in FIG. 6, the connecting element 44 can be an angle bar, which connects to the first extruding element 42 and the second extruding element 43 by screwing. In the embodiment, the material of the connecting elements 44 is, for example but not limited to, metal, plastic or rubber.

With reference to FIG. 2 again, the first extruding elements 42, the second extruding elements 43 and connecting elements 44 are assembled or connected, and then connected to the bottom plate 41. In this case, the first extruding elements 42 can press the spacers 21 into the through holes 411 of the bottom plate 41, and thus the spacers 21 are disposed between the first extruding elements 42 and the bottom plate 41. Therefore, the conventional lamp fixing base is unnecessary in the invention. In practice, the bottom plate 41 can be connected with the first extruding elements 42, the second extruding elements 43 and the connecting elements 44 by screwing or adhering.

Since the first extruding elements 42 and the second extruding elements 43 of the back plate 40 are manufactured by cutting a striped-shaped extruding work piece, which is formed by extrusion molding with the same die, into different lengths according to the size of the light emitting unit 20. By this manufacturing method, the first extruding elements 42 and the second extruding elements 43 can be applied to the light emitting units 20 of different sizes. Therefore, the various molds used in the related art are unnecessary, so that the manufacturing cost can be reduced. Furthermore, the anti-bending abilities of the first extruding elements 42 and the second extruding elements 43 are both good. Thus, when they are combined with the connecting elements 44, the closed region with the strengthened structural and anti-torque intensities can be formed. Moreover, since the structural intensity of the back plate 40 is mainly provided by the first extruding elements 42 and the second extrusion elements 43, the lamp fixing base of the related art is unnecessary. In addition, the conventional back plate 11 for fixing the major components is also unnecessary, so that the bottom plate 41 can be made of thinner metal or non-metal sheet. This can reduce the manufacturing cost and the weight of the light emitting unit 20. With reference to FIG. 2, the light emitting unit 20 may further include a diffuser 22, an optical film set 23 and a frame housing 24. The diffuser 22 is disposed on the first extruding elements 42 and the second extruding elements 43. The optical film set 23 is disposed on the diffuser 22. Depending on the requirements, the optical film set 23 may include a top diffusion film, a brightness enhancement film (BEF) and a bottom diffusion film (not shown). The top diffusion film is disposed opposite to the bottom diffusion film, and the BEF is disposed between the top and bottom diffusion films. Of course, the optical film set 23 may include a diffusion film and a BEF. The frame housing 24 is disposed on the optical film set 23, and is connected with the first extruding elements 42 and second extruding elements 43 by screwing or inserting. Thus, the diffuser 22 and the optical film set 23 can be fixed between the frame housing 24, the first extruding elements 42 and the second extruding elements 43. The frame housing 24 includes a plurality of frame bars 241 and a plurality of combining members 242. The frame bars 241 and the combining members 242 are connected with each other by screwing or adhering so as to form the frame housing 24. Of course, the frame bars 241 can be extruding frame bars, which can provide the fixing function and further increase the structural intensity. As described above, the frame housing 24, diffuser 22, optical film set 23, lamps 30 and back plate 40 can be assembled to form a backlight module.

In summary, in the light emitting unit and back plate of the invention, at least one lamp is disposed on the back plate and a plurality of connecting elements are provided to connect the first and second extruding elements so as to form a closed region. In addition, the first extruding elements, the second extruding elements and the connecting elements are all disposed over the lamp and the bottom plate. The first extruding elements are disposed on two opposite edges of the bottom plate, and the second extruding elements are disposed on the other two opposite edges of the bottom plate. Compared with the related art, the first extruding elements and the second extruding elements are formed by cutting a striped-shaped extruding work piece, which is formed by extrusion molding with a die, into different lengths according to the size of the light emitting unit. By this manufacturing method, the first and second extruding elements can be applied to the light emitting units of different sizes. Therefore, the various molds used in the related art are unnecessary, so that the manufacturing cost can be reduced. Furthermore, the anti-bending abilities of the first and second extruding elements are both good. Thus, when the first and second extruding elements are combined with the connecting elements, the closed region with the strengthened structural and anti-torque intensities can be formed so as to avoid the deformation of the light emitting unit caused by external forces. Moreover, since the structural intensity of the back plate is mainly provided by the first and second extrusion elements, the lamp fixing base of the related art is unnecessary. In addition, the conventional back plate for fixing the major components is also unnecessary, so that the bottom plate can be made of thinner metal or non-metal sheet. This can reduce the manufacturing cost and the weight of the light emitting unit.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light emitting unit, comprising:
   at least one lamp;
   a plurality of separators disposed on two ends of the lamp, respectively; and
   a back plate, wherein the lamp is disposed on the back plate, and the back plate comprises:
   a bottom plate;
   a plurality of first extruding elements respectively disposed on two opposite edges of the bottom plate;
   a plurality of second extruding elements respectively disposed on the other two opposite edges of the bottom plate; and
   a plurality of connecting elements connected with the first extruding elements and the second extruding elements, respectively, wherein the first extruding elements, the second extruding elements and the connecting elements form a closed region,
   wherein the bottom plate has a plurality of through holes disposed at two edges of the bottom plate, and the separators pass through the through holes, respectively.

2. The light emitting unit according to claim 1, wherein the first extruding elements press against the separators and are combined with the bottom plate.

3. The light emitting unit according to claim 1, wherein cross sections of the first extruding elements and the second extruding elements are the same.

4. The light emitting unit according to claim 1, wherein each of the first extruding elements and the second extruding elements is made of metal or alloy.

5. The light emitting unit according to claim 1, wherein the connecting element has a first connecting portion connecting to the first extruding element and a second connecting portion connecting to the second extruding element.

6. The light emitting unit according to claim 1, wherein the connecting element is connected with the first extruding element and the second extruding element by screwing or inserting.

7. The light emitting unit according to claim 1, wherein the connecting element is an angle bar.

8. The light emitting unit according to claim 1, further comprising:
   a diffuser disposed on the first extruding elements and the second extruding elements; and
   an optical film set disposed on the diffuser.

9. The light emitting unit according to claim 8, further comprising:
   a frame housing disposed on the optical film set and connected with the first extruding elements and the second extruding elements, wherein the diffuser and the optical film set is disposed between the first extruding elements, the second extruding elements and the frame housing.

10. The light emitting unit according to claim 9, wherein the frame housing has a plurality of frame bars and a plurality of combining members for combining the frame bars to form the frame housing.

11. The light emitting unit according to claim 10, wherein the frame bars are extruding frame bars.

* * * * *